(No Model.)

H. TEXTOR.
Sewer Trap.

No. 237,066.    Patented Jan. 25, 1881.

WITNESSES:
A. Schehl.
C. Sedgwick.

INVENTOR:
H. Textor
BY Munn & Co.
ATTORNEYS.

UNITED STATES PATENT OFFICE.

HENRY TEXTOR, OF BROOKLYN, NEW YORK.

SEWER-TRAP.

SPECIFICATION forming part of Letters Patent No. 237,066, dated January 25, 1881.

Application filed July 16, 1880. (No model.)

*To all whom it may concern:*

Be it known that I, HENRY TEXTOR, of Brooklyn, in the county of Kings and State of New York, have invented a new and Improved Sewer-Trap, of which the following is a specification.

The object of my invention is to provide a new and improved sewer-trap which will prevent the flow of backwater, and which cannot become clogged by the sediments or floating matter of the water.

The invention consists in a hemispherical or cup-shaped vessel, connected with the sewer, and provided with a cup-shaped strainer containing a guided hollow metal float, which is raised by the backwater and pressed against the lid of the vessel, which is provided with a central aperture, and is covered by a strainer held down onto the vessel by a removable screw-clamp. The vessel is provided with an opening closed by a screw-plug for cleaning the same.

Figure 1:
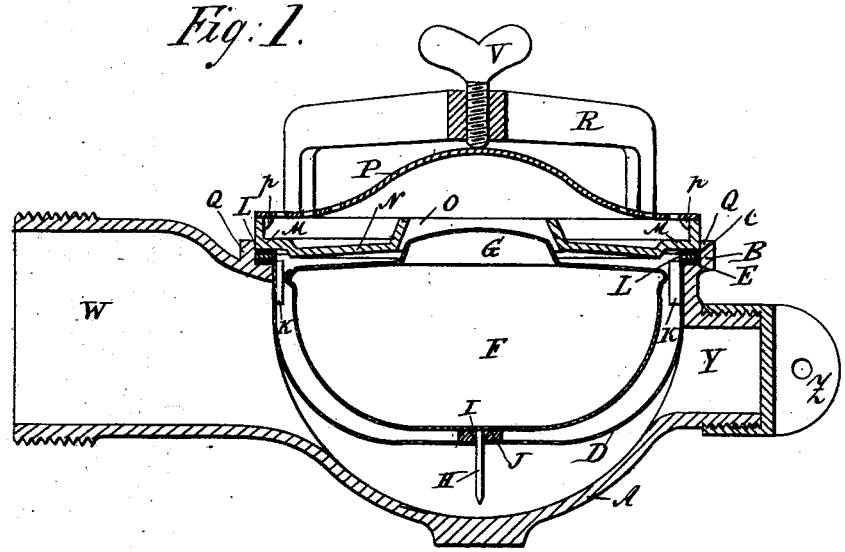
Figure 2:
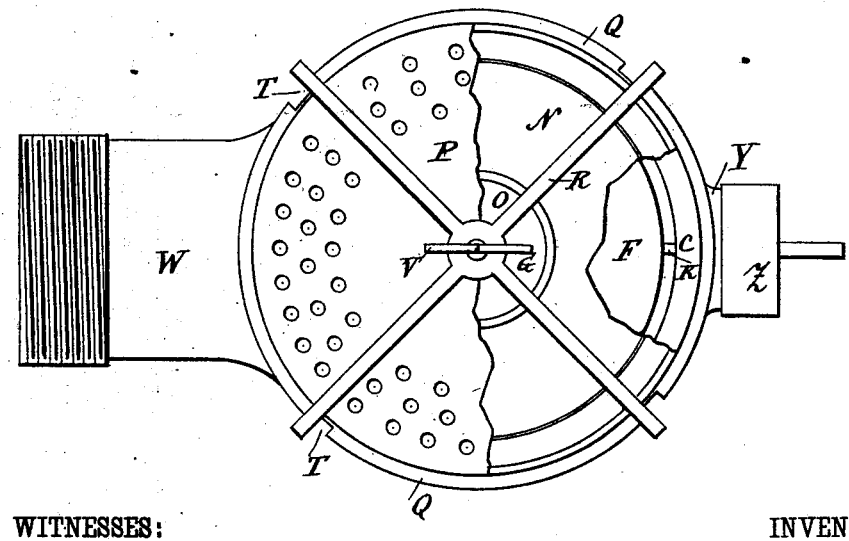

In the accompanying drawings, Figure 1 is a longitudinal sectional elevation of my improved sewer-trap. Fig. 2 is a top view of the same, showing part of the top strainer and the lid broken out.

The cup-shaped vessel A is provided with an annular shoulder, B, upon which the flange C of a cup-shaped strainer, D, of less height than the vessel A, rests, a packing-ring, E, of rubber, leather, or some other suitable material, being interposed between the shoulder and the flange. This strainer D contains a hollow metal float, F, provided with a circular raised part, G, in the center of the top, and with a pin, H, fitting into a central aperture, I, of a disk, J, in the center of the bottom of the strainer D. The float F has a slightly smaller diameter and height than the strainer D, and to prevent the float from resting against the bottom of the strainer and closing the apertures of the same the above-named disk J is provided. The float is guided by the pin H, and by two or more ridges, K K, on the inner sides of the strainer D. A packing-ring, L, of leather or rubber, is placed upon the flanges C, and upon this ring the annular shoulder M of a cover, N, provided with a central opening, O, rests.

A strainer, P, provided with three or more studs, *p p*, a short distance from the edge, rests on the ring Q on the top of the vessel A, forming the shoulder B, and this strainer is held down on the vessel A by means of the clamp R, having two or more arms, and the screw V. The ends of the arms of the clamp R are provided with a recess, so that the clamp can be passed down through the recesses T in the ring Q, and can then be turned so that the end parts of the clamp can catch on the ring Q.

The vessel A is connected with the sewer by means of a tube, W, and is provided with an opening, Y, opposite the tube W, closed by a screw-plug, Z.

The float may be supported by some other device instead of the strainer D.

The operation is as follows: This apparatus is to be placed in the lowest part of a cellar or like apartment, or wherever such a trap is required. The water that collects will flow through the strainer P, through aperture O, down over the float, through the space between the float F and the sides of the strainer D, through the strainer D, and out through the tube W into the sewer. The dirt and floating matter cannot enter into the vessel A on account of the strainer P. If there is any backwater, the same will flow through the tube W and the strainer D, and will raise the float F up against the cover N, the raised part G of the float passing into the aperture O and closing the same. As the pressure of the backwater increases, the pressure of the float against the cover N increases likewise, and the aperture O is closed so tight that no water can flow through the same. As soon as the pressure of the backwater ceases the float drops. The strainer D prevents any floating material on the water in the sewer from entering into the vessel A. In case that any dirt has been deposited in the pipe W and the bottom of the vessel A, the cover, strainers, and float are taken out of the vessel and the plug Z is screwed off, so that the trap can be easily cleaned. The sides of the aperture O, and of the raised part G of the float F, are beveled, so as to form a better joint, but may be arranged in any other suitable manner, and may be provided with a rubber seat on the inner side of the inclined walls of the aperture O.

I am aware that floats have been used in sewer-traps heretofore, and do not claim this idea, broadly; but,

Having thus described my invention, what I claim as new, and desire to secure by Letters Patent, is—

1. A sewer-trap for preventing the flow of backwater, made substantially as herein shown and described, and consisting of a cup-shaped vessel connected with the sewer, and provided with a cup-shaped strainer containing a float, which is pressed up against the lid of the vessel and closes the aperture in the same, which lid is covered by a strainer, as set forth.

2. The combination, with the vessel A, of the float F, the cup-shaped strainer D, and the lid N, substantially as herein shown and described, and for the purpose set forth.

3. The combination, with the vessel A, of the float F, the lid N, the strainer P, and a device for supporting the float, substantially as herein shown and described, and for the purpose set forth.

4. In a sewer-trap, the combination, with the float F, of the strainers D and P and lid N, substantially as herein shown and described, and for the purpose set forth.

5. The float F, constructed, substantially as herein shown and described, with a central beveled projection, G, fitting against the beveled sides of the aperture O in the lid N, as set forth.

HENRY TEXTOR.

Witnesses:
OSCAR F. GUNZ,
C. SEDGWICK.